United States Patent
Gross et al.

(10) Patent No.: US 8,996,529 B2
(45) Date of Patent: Mar. 31, 2015

(54) SYSTEM AND METHOD FOR RECOMMENDING CONTENT SOURCES

(75) Inventors: John Nicholas Gross, Berkeley, CA (US); Philip Albert, Los Altos, CA (US)

(73) Assignee: John Nicholas and Kristin Gross Trust, Berkeley, CA (US)

(*) Notice: Subject to any disclaimer, the term of this patent is extended or adjusted under 35 U.S.C. 154(b) by 586 days.

(21) Appl. No.: 13/292,725

(22) Filed: Nov. 9, 2011

(65) Prior Publication Data
US 2012/0124073 A1    May 17, 2012

Related U.S. Application Data

(60) Provisional application No. 61/414,370, filed on Nov. 16, 2010.

(51) Int. Cl.
G06F 7/00       (2006.01)
G06F 17/30      (2006.01)

(52) U.S. Cl.
CPC .............................. G06F 17/30873 (2013.01)
USPC ........... 707/739; 707/722; 707/794; 715/712; 715/866

(58) Field of Classification Search
USPC .................... 707/722, 739, 794; 715/712, 866
See application file for complete search history.

(56) References Cited

U.S. PATENT DOCUMENTS

| | | | |
|---|---|---|---|
| 5,583,763 A | | 12/1996 | Atcheson et al. |
| 6,897,866 B1* | | 5/2005 | Hetzler et al. ................. 345/440 |
| 6,983,282 B2 | | 1/2006 | Stern et al. |
| 7,346,630 B2 | | 3/2008 | Eichstaedt et al. |
| 8,380,721 B2 | | 2/2013 | Attaran Rezaei et al. |
| 2006/0161507 A1 | | 7/2006 | Reisman |
| 2008/0098014 A1 | | 4/2008 | Eichstaedt et al. |
| 2008/0141117 A1 | | 6/2008 | King et al. |
| 2009/0319449 A1 | | 12/2009 | Gamon et al. |
| 2010/0131455 A1* | | 5/2010 | Logan et al. .................. 707/602 |
| 2010/0287033 A1* | | 11/2010 | Mathur ........................... 705/10 |
| 2010/0299432 A1 | | 11/2010 | Emanuel et al. |
| 2011/0029636 A1* | | 2/2011 | Smyth et al. .................. 709/217 |
| 2011/0072024 A1 | | 3/2011 | Barney |
| 2011/0093520 A1 | | 4/2011 | Doyle et al. |
| 2011/0153646 A1 | | 6/2011 | Hong et al. |
| 2011/0252027 A1 | | 10/2011 | Chen et al. |
| 2011/0291851 A1 | | 12/2011 | Whisenant |
| 2011/0295612 A1 | | 12/2011 | Donneau-Golencer et al. |
| 2011/0295762 A1 | | 12/2011 | Scholz et al. |
| 2011/0295780 A1 | | 12/2011 | Tyson et al. |

OTHER PUBLICATIONS

Antonellis, Ioannis et al.; "Succinct Coverage Oracles," http://arxiv.org/abs/0912.2404v2, Dec. 2009, 17 pages.

Ausiello, Giorgio et al.; "Online maximum k-coverage," Fundamentals of Computation Theory Lecture Notes in Computer Science vol. 6914, 2011, 17 pages.

(Continued)

*Primary Examiner* — Hosain Alam
*Assistant Examiner* — Bruce Witzenburg
(74) *Attorney, Agent, or Firm* — Law Office of J. Nicholas Gross, P.C.

(57) ABSTRACT

A networked computer system identifies, optimizes and recommends content sources for users. The content sources can be used for providing news feeds, search results, etc. based on taking into net useful content contributed by such sources over other sources.

33 Claims, 8 Drawing Sheets

(56) References Cited

OTHER PUBLICATIONS

Chierichetti, Flavio et al.; "Max-Cover in Map-Reduce," Proceeding WWW '10 Proceedings of the 19th international conference on World wide web, 20 pages.

Cormode, Graham et al.; "Set Cover Algorithms for Very Large Datasets," CIKM '10, Oct. 26-30, 2010, 10 pages. Toronto, Ontario, Canada.

El-Arini, Khalid et al.; "Turning Down the Noise in the Blogosphere," KDD'09, Jun. 28-Jul. 1, 2009, Paris, France, 9 pages.

Saha, Barna et al. "On Maximum Coverage in the Streaming Model & Application to Multi-topic Blog-Watch," 2009 SIAM International Conference on Data Mining (SDM09)—Apr. 2009, 12 pages.

* cited by examiner

FIGURE 7

| Entity | E1 | E2 | ..... | ... | En |
|---|---|---|---|---|---|
| E1 | - | S(1,2) | | | S(1,n) |
| E2 | | - | | | |
| .... | | | - | | |
| Em | S(m,1) | S(m,2) | | | S(m,n) |

700

FIGURE 8A
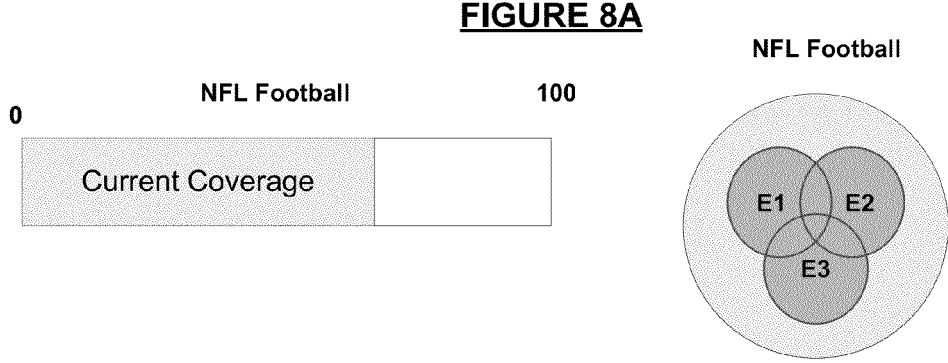
FIGURE 8B
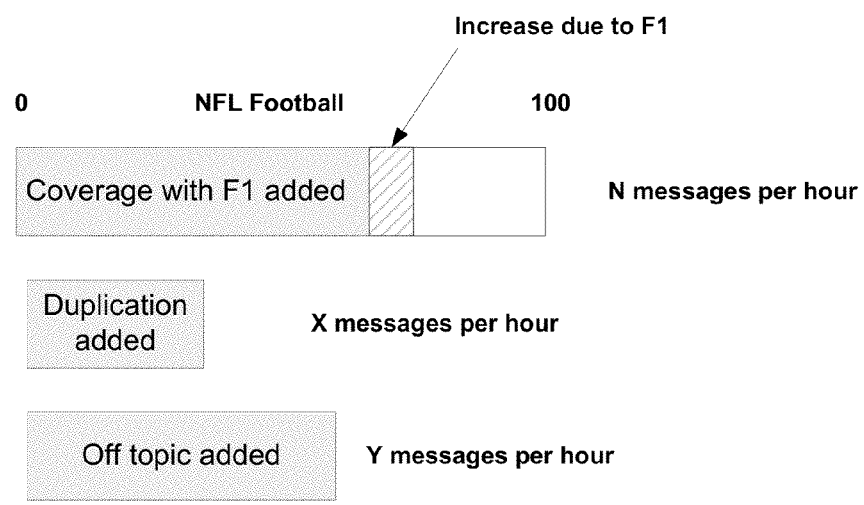
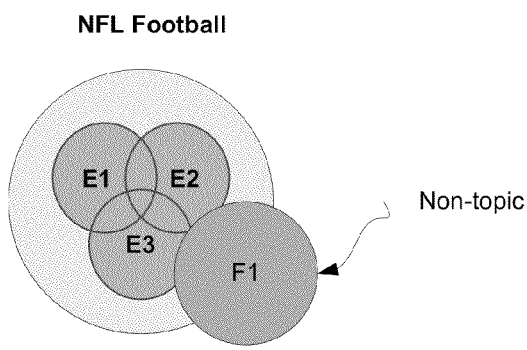

NFL Football 0    60    100

Current Coverage

90

Desired Increase from additional followees 810

810

New Followees to be added: Set {En1, En2....Enk}

| Duplication added | X1 messages per hour |

| Off topic added | Y1 messages per hour |

NFL Football coverage

FIGURE 9

| Entity | C1 | C2 |
|--------|----|----|
| E1 | 1 | 0 |
| E2 | 1 | 1 |
| .... | | |
| En | | .5 |

| CK |
|----|
| .8 |
| 0 |
| .... |
| W[n,K] |

900

SYSTEM AND METHOD FOR RECOMMENDING CONTENT SOURCES

RELATED APPLICATION DATA

The present application claims the benefit under 35 U.S.C. 119(e) of the priority date of Provisional Application Ser. No. 61/414,370 filed Nov. 16, 2010 which is hereby incorporated by reference. The application is further related to Ser. No. 13/292,693 which is also incorporated by reference.

FIELD OF THE INVENTION

The present invention relates to systems and methods for determining, optimizing and recommending content soures for messaging, news and search engine systems accessible over electronic networks.

BACKGROUND

There was a time when the number of broadcast sources that an individual could use for obtaining information could be counted on a short list. However, when the Internet was added as a vehicle for providing information, many more sources of information that might have existed previously but unavailable to a given user, such as an out-of-town local newspaper, became readily available. In some sense that was still manageable in a way. For example, while the out-of-town local newspapers moved their content online and might have sent it to individual users, that still was manageable, as any given user would only be interested in a few towns—such as the town someone grew up in—and that newspaper had an editorial function that ensured that only articles of general interest were published.

Social networking and information broadcasting sites are now prevalent and widely accessed by Internet users. Significantly, a social network can involve communication emanating from millions of users and this is, in most cases, too much for any one reader to handle, absorb or use. As a result, there is a need for mechanisms to control the deluge of possible information.

Sometimes, the information is filtered in a "request" manner, i.e., while there might be billions of pages of information available to a user, the user does not have to deal with all of those pages because the user selects a specific page, uses a search engine to identify a specific page to request or other mechanisms are used so that the user's request is for a specific piece of information. For example, the user can type in the URL (Uniform Resource Locator) from the user's list of bookmarked URLs for the page specific to tomorrow's weather in the user's local town or the page specific to events related to a specific celebrity.

However, at other times, social networks and other tools provide the information to the user in the form of streams of messages. Examples of such message streams include e-mail, instant messages, mobile phone calls, SMS (Short Message Service) messages, and/or the like. Such messages are broadcast from a source to destinations or sent from one source to one destination. In the general case, messages originate at a source and are received at a destination if that source and that destination are linked in a message graph.

In some cases, the source is an individual writing a message assumed to be of interest to the destinations that are linked in the message graph to that source, but the source can also be a business entity, government entity, organizational entity, and/or a computer entity (examples of the latter being hardware and/or software running a program that determines what messages to send and when—often useful for automated alerts triggered by computer programming).

While not explicitly spelled out, there is an electronic component that actually sends the message. For example, while it might be said that "celebrity movie star C.M.S. sent a message announcing her presence at a fashion show" it is more typically that C.M.S. caused some electronic device, such as their smart phone, to generate a message they typed in and pressed "Send." Thus, in typical parlance, saying that a person sent a message typically implies that some electronic device generated the message and sent it into a networked environment, e.g., one were servers know that when a message is received from a particular source (or appearing to be received from a particular source), it is forwarded and/or replicated and forwarded to destinations according to a message graph. Likewise, at the destination side, there are users (who can be individuals, entities and/or computer elements) that receive messages on destination devices.

One such messaging service is operated by Twitter™, which offers a service by which members can broadcast content in 140 character chunks known as "Tweet" messages to anyone in the Twitter™ community. Individual members can choose which user feeds to subscribe to, resulting in a type of information stream that suits the tastes, interests/topics that the user is interested in. In the Twitter™ system, destinations are devices (cell phones, web browsers, Twitter™ apps, etc.) that receive Tweet™ messages and likewise the sources are devices that push Tweet™ messages into the Twitter™ system. The destination and/or source devices can be cell phones with SMS capability, devices with web browser capability, devices that can run specialized Twitter™ apps, or the like.

Twitter™ maintains a message graph mapping sources and destinations. For each edge in the Twitter™ message graph, the destination is said to be "following" the source (sometimes referred to as the "followee"). In other words, if user A "follows" user B, then when user B posts a Tweet™ message, it is provided to user A's list of Tweet™ messages. The graph is a directed graph, i.e., user A following user B does not necessarily imply that user B follows user A. Twitter's™ message graph is colloquially thought of as the lists of everyone's followers.

Another example is the message wall provided to users of Facebook™. Yet another example is comment boards that allow users to post messages and respond to posted messages. Similar considerations are found in multi-media content provider systems which attempt to introduce media (e.g., a new song or movie for example) to users based on consumption habits of other users in the community. Internal knowledge systems which allow employees to enroll and receive selected emails from other co-workers on particular topics are yet another.

Additional references in this area, which are incorporated by reference herein, include:

United States Patent Application 20100299432 to Dotan—directed to managing user information streams.

United States Patent Application 20110029636 to Smyth which discloses a real time information feed system.

United States Patent Application 20110153646 to Hong which is a system for triaging information feeds.

United States Patent Application 20110252027 to Chen which is directed to recommending interesting content in an information stream.

United States Patent Application 20110093520 to Doyle which automatically identifies and summarizes content published by key influencers.

A common problem in these kinds of information following systems of course is the fact that users (particularly new users) are challenged to identify appropriate content sources to follow for the topics they are interested in. Twitter™ has addressed this problem, in part, by creating/assembling their own "lists" of entities that they deem most suitable/appropriate for certain categories of content. For the most part, however, these lists tend to be dominated more based on the celebrity status of the entity, and less so on the actual useful information contributed by the entity in question. Twitter™ also lets users make their own lists of people to follow, and one can review and "mine" the lists of others for leads as well. However, in the end, this just pushes the problem again to the end user to find and identify content of interest.

Generalized recommendation engines are known. For example, U.S. Pat. No. 5,583,763 entitled "Method and Apparatus for Recommending Selections Based on Preferences in a Multi-User System" disclosed that music purchaser selections could be recommended to one user based on a commonality of prior purchases between that one user and other users, for example, recommending song S1 to user U1 because user U2 bought many songs in common with user U1, but user U2 also bought song S1 and user U1 has not yet bought song S1.

Follower recommendation systems might perform a similar action with respect to users and who each of them follows, but still there can be a tendency for lists to become nothing more than popularity driven, in that the same sources will appear all the time on every list without regard to their actual utility to the user/topic. In addition, early users/adopters tend to be rewarded beyond their real value since they will artificially appear in successive lists without regard to their contributions.

The problem of designating which sources to follow will become even more unmanageable as message services become more popular and users start to "follow" more and more publishers of content. At some level of participation, the user's information stream (and overall experience) becomes degraded by the proliferation of duplicate content. Duplicate content threatens the utility of information streams. If content that is useful and nonduplicative (i.e., information, rather than just bits and bytes of data) to a user is considered signal, and the duplicate, irrelevant and uninteresting (to that user) messages are considered noise, a desirable goal is to raise the signal-to-noise ratio ("SNR")—of course with something better than requiring the user to manually read and delete the noise or read and scroll through the noise to get to the signal.

Similar problems exist in other fields as well, including social networking sites, internal emailing lists, etc. In fact, where the number of sources can be on the same order of the number of destinations, there can be a problem wherein there is a high percentage of duplicate content and even when sources are suggested, that can result in a high percentage of duplicate content. It can be expected that in any data crawling/aggregation field (including for search engines) the identification and selection of appropriate and optimal content sources is a prime concern. Given a finite amount of time and resources to characterize or identify relevant content for a topic, it is desirable to know to which sources are more likely to have relevant material.

Clearly, there is a need for systems and methods to improve the signal-to-noise ratio in such systems and existing approaches might attempt to do so, but are not sufficient.

SUMMARY OF THE INVENTION

An object of the present invention, therefore, is to reduce and/or overcome the aforementioned limitations of the prior art.

In a message distribution system according to aspects of the present invention, users who receive messages from sources according to their source selections are provided with indications of relative utility of additional sources based on content of messages from sources already selected by the users.

In specific embodiments, a message graph is maintained by a messaging server or system and the message graph maps sources to destinations such that a message originated at a source is passed to destinations that have a link (edge) in the message graph from the source to that destination. The links that terminate at a destination correspond to the sources that the user at that destination selected to follow. Where a user that has previously selected sources to follow and those previously selected sources have generated messages, the content of those messages, possibly also metadata of those messages, as well as other information about the selected sources, is used to provide recommendations to the user seeking to select additional sources, to deselect existing sources or select a level of participation with a particular source. In some specific embodiments, the recommendation is in the form of a rating on a rating scale wherein the rating represents how well the new source is likely to improve and information-to-noise ratio for that user.

A search engine or other query/answer system can also benefit from techniques which optimize a data harvest by focusing on more relevant sources.

Other features of the invention will be apparent upon reading the present disclosure with reference to the figures and other elements of this application.

DESCRIPTION OF THE DRAWINGS

FIG. 7 depicts a format and substance of a typical entity information overlap correlation table that can be used in accordance with an exemplary embodiment of the present invention;

FIG. 8A depicts a format and substance of a typical entity—content coverage graph/visualizer which can be used in accordance with an exemplary embodiment of the present invention;

FIG. 8B depicts a format and substance of a typical entity—content information gain/coverage graph/visualizer which can be used in accordance with an exemplary embodiment of the present invention;

FIG. 9 depicts a format and substance of a typical correlation table that can be used in accordance with an exemplary embodiment of the present invention.

DETAILED DESCRIPTION

Figure 1:
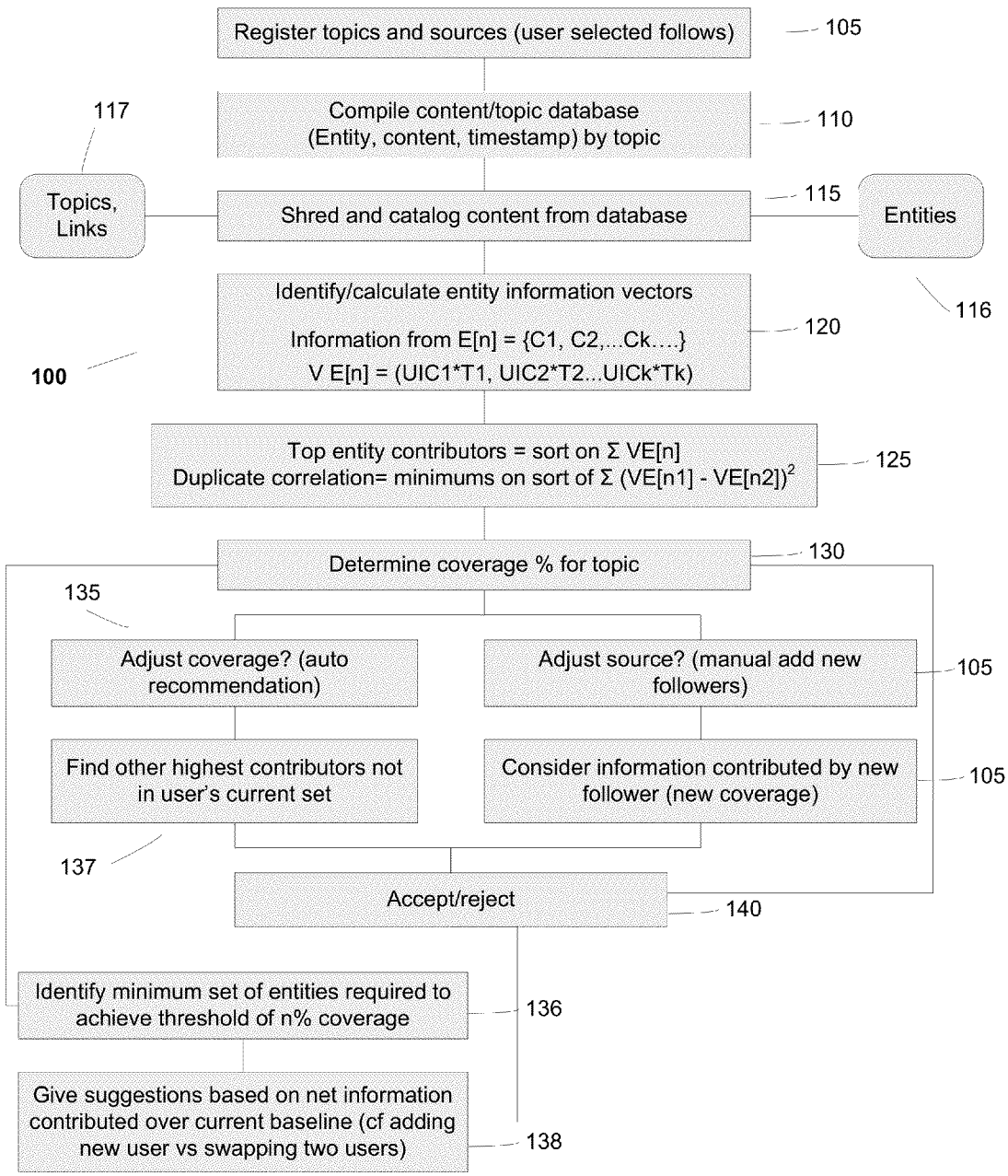
FIG. 1 illustrates a content source recommendation process implemented in accordance with an exemplary embodiment of the present invention.

As will be explained in more detail below, message distribution systems with many sources create problems for users in selecting sources, where the user cannot feasibly follow all sources and many of the sources send messages without necessarily considering whether they are timely, duplicative, useful and/or informative to any particular audience. To address this, example message distribution systems described below can manage user selection of sources based indications of relative utility of additional sources based on content of messages from sources already selected by the users.

In the examples below, specific messaging systems might be described, but unless otherwise indicated, it should be apparent that in general a messaging system comprises some sort of electronics, such as a processor, program code executed by that processor, special-purpose hardware, firmware, software, etc. that allows for the generation of messages and the propagation of messages. As used herein, a "message" originates with a "source" and is "passed" to a "destination" according to a "message graph" by a messaging server or service.

A "message" might refer to the unit of traffic of the messaging server/service and could also refer to related metadata. For example, a message might be a 140-character string (or 160-character string, or generalized message) reading "Thank you all for attending my concert. You were a great audience" sent at time $T_1$. Metadata for the message might include an imbedded URL (pointing to a website for the artist, or a concert page) and the time, $T_1$, of the message. In some systems, a unit message is referred to as a "Tweet" (the Twitter™ system), a "posting" (in a social networking system, a message board, a chat list or the like), or similar. For simplicity, the unit will be referred to in the present examples as a message. The actual technical nature of the message might be a packet, an instant message, a chat message, a voice message, a block of text, or the like. The channels, as is well-known, may represent any number of electronic transmission venues for presenting information to users, including the Internet, a cell phone based link, a wireless link, and other well-known schemes.

As used herein, an "information unit" corresponds to a granularity at which the message distribution system or a source selection system considers messages from the individual publishers/users ("sources") to measure their contributions. For example, an information unit may be as basic as a URL identifying a document (which could be a text page, a webpage, an image, a video, or some other form of content). In other instances, the information unit may correspond to a larger or higher level block of content in the message representing some statement about an event, such as "President Obama is now arriving at Camp David," or "Red Sox 5, Angels 0" or the like. In still other instances, the information unit may represent a natural language engine classification or interpretation of the content, such as in the latter case, an interpretation that indicates "Red Sox are winning." Other metadata could be considered as part of the information unit as well. Thus, those skilled in the art will appreciate, after reading this disclosure, that the information units can be defined at a number of useful granularities and complexities depending on the needs and requirements of the message distribution system.

A source of a message is generally considered to be some sort of device, hardware or software. In some cases, the source is referred to as a particular individual, business entity, government entity, organizational entity, and/or computer entity, or more precisely, the device, hardware and/or software operated at their behest. An example of a computer entity that is a source is a location server that generates messages without human interaction based on location information received by the location server to, for example, employ computing and software facilities to auto-generate or push content related to the location of an individual based on a reporting function within a portable device.

Likewise, a destination of a message is generally considered to be some sort of device, hardware or software and might be referred to as a particular individual, business entity, government entity, organizational entity, and/or computer entity, or more precisely, the device, hardware and/or software operated at their behest. An example of a computer entity is a client-side application that reads messages and performs some actions based on the messages.

A messaging server or service is an electronic system that receives messages generated by sources and "passes" them to destinations that are scheduled (based on a message graph) to receive them. "Passing" can refer to actually sending the messages, sending them in a broadcast fashion or individually, or merely making them available and/or visible to the destination users according to the user interface they use.

The messaging server or service can maintain the message graph in many different forms. In the simplest case, the message graph can be represented by a (sometimes very large) graph comprising nodes (sources, destinations) and edges connecting those nodes. In some cases, the edges are directed edges, such that the two nodes connected by the edge are connected in one direction only (i.e., a source is a source for a destination, but that does not require a link back from that destination to that source). Of course, two users (nodes) could choose to follow each other, in which case that might be stored as two edges, one in each direction, between those nodes. Herein, where the edges are not symmetric, the source on an edge might be referred to as a "followee" and the destination on that edge is the "follower" to reflect that the user of the destination device has chosen to "follow" the source, i.e., receive messages that the source might send. The list of sources that a destination follows can be referred to as that destination user's "follow group."

In the typical system, the destination user chooses which sources to follow and from time to time makes changes to that user's "following" list, i.e., adds or deletes sources that the user follows. Of course, the message graph changes accordingly.

As explained in more detail below, where a user that has previously selected sources to follow and those previously selected sources have generated messages, the content of those messages, possibly also metadata of those messages, as well as other information about the selected sources, is used to provide recommendations to the user seeking to select additional sources, to deselect existing sources or select a level of participation with a particular source. In some specific embodiments, the recommendation is in the form of a rating on a rating scale wherein the rating represents how well the new source is likely to improve and information-to-noise ratio for that user. Again in some embodiments a particular domain knowledge engine (sports, science, stocks, etc.) or search engine may be similarly recommended to follow a new source which improves a quality, timeliness, etc., of information covered by the domain in question.

A very specific example is as follows. Suppose User $D_1$ follows Users $S_A$, $S_b$, and $S_c$. Someone suggests to User $D_1$ (or the user may discover on their own) that they should follow User $S_R$ because User $S_R$ typically has early or insightful news of political events in a particular region of the world. A source selection system might be part of the message distribution system or an entirely separate system. When User $D_1$ indicates to the source selection system that User $D_1$ wants to add User $S_R$ to User $D_R$'s following list, the source selection system might process/analyze (or have analyzed in advance) the content of messages from Users $S_A$, $S_b$, and $S_c$ and determine that most of the messages from User $S_R$ are delayed copies (or substantial copies) of news already provided by User $S_b$ and based on that, rate User $S_R$ low (specifically for User $D_1$) and possibly indicate the reason for the low rating. User $D_1$ then has more insight on the benefit or utility of adding User $S_R$ and might then decline to add him/her.

In some systems, the decision to follow need not be binary (i.e., follow or not follow), but can be to follow under certain threshold conditions, preferably automatically tested. For example, there are many Twitter™ sources who post newsworthy, funny and/or interesting posts on important topics, but from time to time might want to talk about something of limited interest. For example, one user might be a good source for information about various political events or entertainment events, but might also post numerous messages about items of limited interest to others (e.g., "protesters are gathering at the town square for Occupy Oakland", "Wow, C.M.S. is just strolling around the boardwalk, right now!", "I am going to try to replace my harddrive", "I got the screws out OK. Wish me luck", "Now, reinstalling drivers . . . ", "Success. Shiny new hard drive running smoothly", "the national news media just showed up at the town square!") In such cases, to keep up the information-to-noise ratio (assuming a user doesn't actually care about on-going computer repairs), the destination user might select only certain levels of messages from a given source which exceed a configurable threshold. The levels might be a fixed number (e.g., A, B and C levels) or an unknown number (e.g., some integer where lower integers represent higher levels).

A level of a specific message might be set by the source manually, set at the source side automatically based on some programming parameters, set at the destination side automatically based on some programming parameters and the content of the messages, etc. Thus, a source sender could assign level "A" to important messages clearly of interest to the sender's followers, level "B" to questionable messages and level "C" to messages clearly destined for only the most dedicated of followers. Alternatively, or in addition, the device or system used by the destination user (or part of the messaging system) can automatically consider the content of messages and based on that content or other metadata, set the level of the message. Then, if the user has specified to follow that source, but only at a threshold level of "B" or above, level "C" messages would not appear for that destination user's message list, inbox or datastream.

In other specific embodiments, sources can be formed into logical groups of sources, such that a destination can select a group of sources. This might be useful when a plurality of sources are known to collectively cover a knowledge area with some degree of non-overlap, thus ensuring a minimum amount of effort and data required to follow a particular field. This is typically the case in social networks where multiple users collectively follow each other and when they see that particular information is already out there, will not send a duplicative message, but will limit themselves to messages that add to what has already been posted (and generally refrain from saying "me, too" without more).

As will be explained, the source selection system can apply rigorous tenets of information theory in compiling and presenting content. Embodiments of source selection systems can consider the unique/novel content contributed by each source, and how it compares to other sources already available and/or used. In addition, the source selection system can also consider a timeliness of the source with respect to the information items, to further enhance the user's experience by virtue of seeing developing information more quickly. By using these types of factors, a source selection system can maximize the amount of useful information presented to users over time, and minimize the amount of redundant or irrelevant information.

As further described herein, some considerations and parameters that can be considered by some embodiments of a source selection system according to aspects of the present invention in the source selection process can include: (1) data related to a net total information offered by a particular source or publisher on a topic, including entities within one's follow group; (2) the benefit of information presented by user within a topic overall versus total cost of including that user's other non-topic information within a feed; (3) the overall relevance of a user within a particular topic, as measured by the percentage of content relevant to a topic to a total body of content; (4) the ability to present users with ratings of their own relative contributions/coverage within a topic, and examining the coverage offered by other contributors within a community, in effect providing sources with indications of their own ratings; (5) allowing users to "fill" their stream with content at a certain rate on a certain topic by dynamically adjusting the number of followees that are included in a data feed (e.g., follow A, B, C and D, but if there get to be more than M messages in a day, stop following D for the rest of the day); and/or (6) allowing users to identify first tier and second tier designees who are used as fallbacks when the data feed becomes slower/less busy with active content (e.g., follow A, and B, but if there are less than M messages in a week, start following C and D as well).

Illustrations of Example Systems

FIG. 1 illustrates an example of a content source recommender process 100 that is adapted for presenting useful and valuable suggestions for content followers to a user, taking into account net information gain (NIG) offered by a particular user's message to both an overall general accumulated body of information used within the entire community, and on a more specific level, the advantage offered to another particular user interested in a particular topic. As used herein, the term "recommender" is intended in its broadest sense to refer to an automated computing system that can consider users, content, etc., and develop correlations between the two for the purpose of providing a suggestion or recommendation to a user, and/or to an automated knowledge system, such as a search engine, query system, etc.

Note that the information compiled concerning the NIG by users can be used by an operator of a broadcast system for the purpose of building out suggested lists of followers for new users. The latter is described in more detail below as its applicability is customized for each combination of follower/followee pairings. As is apparent, since users will typically not adopt or follow all content sources, the community-wide suggested listings might or might not be appropriate for their particular content mix. In a similar manner, a search engine operator can determine a NIG given by a particular source with respect to other information sources.

In general, since the content available for publishing within message systems is often limited (in the case of Twitter™, just 140 characters), a useful piece of information is the presence of URLs or the like linking to other more content-rich documents. Accordingly, the presence and identity of URLs can be detected and catalogued and thereafter used as the information unit of interest. It should be noted that other types of information within the message could be considered as well, including tags, or hashtags as identified below.

As noted in FIG. 1, the user's (or system in the case of a knowledge/search engine) existing sources are identified at 105. In a typical Twitter™-like embodiment, this could be as simple as identifying the list of entities being followed by the user in question. In other applications, the identity of sources may be derived from examining other data feeds used/adopted by the user, including social network friends, RSS feeds, news story selections (for example sections of a news aggregator such as Google™ News), interface selections/configurations such as used to configure a user's home page/social network page and/or the like. Other examples will be apparent to those skilled in the art upon reading this disclosure.

The content, as noted above, can comprise individual messages that are then identified and compiled at step 110 for the user's list of followees. In a search engine or knowledge engine instance, the content could be derived from pages of websites, databases, etc.

In instances where this data is easily retrievable directly from an existing centralized data store for the messages, the content can be extracted directly. In other instances such data may not be made readily available, so the system can instead be bootstrapped over time to study and compile a separate data store for each user which may be stored at a message publishing site or a separate computing system accessible by the user. Each message's author, content and timestamp are identified stored and indexed as well. The user's location and other metadata can also be stored as desired. The timestamp is used to indicate the time which the message content was input by the source user.

In addition, at this time the source selection system can explicitly or implicitly determine categories, topics, etc. of interest to the user. For example, the user's content might be mined and mapped automatically to distinct categories or tags (e.g., source selected tags that are included with a message; in the case of Twitter™, they are referred to as "hashtags" as they are included with the text of a message and set apart by a #hash mark; more generally, they are source-selected tags) without consultation.

Alternatively, the user can be presented with a set of topics $(C_1, C_2, \ldots, C_k)$ and asked to express a preference, interest or rating in one or more topic. The topics can range in breadth and scope to include such items as "Sports", "Finance", "Entertainment", "World News", "Technology", "Local", etc. Other examples might be used as well.

These correlations are compiled in a table 900 (see FIG. 9, as an example) for reference in other operations of the system. The substance and format of this table may be varied in accordance with system requirements and goals. For example, the users may be permitted to specify binary values (e.g., "1" or "0", "yes" or "no") for the relevance/weighting of topics to be considered in evaluating the content contributions of information sources, or nonbinary values (e.g., a weight from 1 to 10 or some other convenient scale).

At step 115, the message content is analyzed to determine appropriate information units, which can include at least uniform resource locators (URLs). In other instances, the presence of user designated tags can also be used as an information unit. Names of individuals, companies, brands, etc., can also be identified, as noted at 116. Other content can be analyzed as noted above to identify appropriate topics or tags 117 for the message. In this manner, the message is classified by the computing system into one of any number of predefined categories/topics with any number of tags, which, again, can be varied in accordance with system and user needs and objectives. Other operations can also be performed depending on system goals and requirements.

Figure 2:
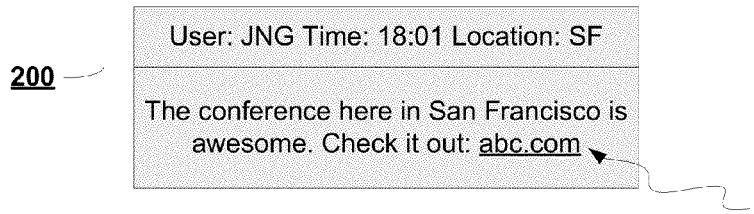
FIG. 2 illustrates a format of a typical message processed in accordance with an exemplary embodiment of the present invention.

An example of a message is shown in FIG. 2, illustrating various pieces of information garnered and classified by the source selection system from a message 200, including headers, identifying information, and information units such as URLs. In some cases, URLs may be abbreviated and shortened (by services such as bit.ly and Twitter™ itself) so that an additional decoding operation is necessary to identify a referenced web document. Other forms of messages are useable as well.

Figure 3:
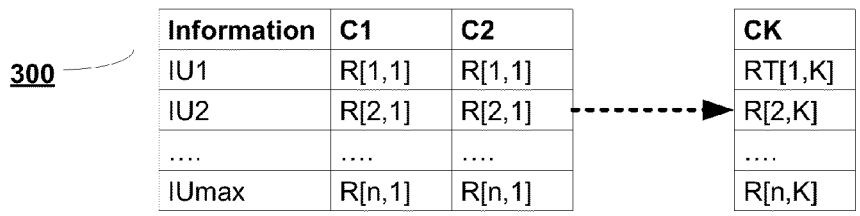
FIG. 3 depicts a typical table or database constructed as an information unit/classification table in accordance with an exemplary embodiment of the present invention.

FIG. 3 depicts a typical table or database that is constructed as an information unit/classification unit table 300 used to identify and classify the various information units ($IU_1$, $IU_2$, ..., $IU_{max}$) into various topics ($C_1$, $C_2$, ..., $C_K$). The information units themselves can be stored in any convenient form. For each corresponding information unit, a relevance factor R may be employed to indicate a correlation between the information unit and a particular category.

As an example, an information unit $IU_1$ might be the phrase "Red Sox" and the categories $C_1$, $C_2$ might be "Baseball" and "Sports", respectively. The correlation factors R[1,1] and R[1,2] could be adjusted as desired to indicate a relative weighting of these concepts and mappings to the particular information unit. In this example, "Red Sox" may correlate higher to "Baseball" than to "Sports"; the correlation factors can be based on any convenient scale, such as ranging from 0 to 1, 1 to 10, 1 to 100, or any other desired range. Note that negative correlation values may be useful in some embodiments.

Returning to FIG. 1, at step 120, an entity information unit table 400 (FIG. 4) is compiled, to indicate, for each entity ($E_1$, ..., $E_n$), an indicator of what specific information units ($IU_1$, $IU_2$, ...) each has contributed to the system, and preferably, an associated timestamp (T). In some instances, it may be desirable to assemble the entity/information tables logically by category. This information may take other forms and include other data as needed for any particular application. At this point, an information contribution vector can be compiled and summed for each entity by computing the product of each of the information units (IU) (which can be simply "1", but can varied to weight the value of content as well) contributed by the entity multiplied by a timestamp value T[1,1]. The timestamp value can be based on a universal date/time clock and have a concatenated form {yearmonthdayhoursecond} or any other well-known system of time measurement. The function used might be other than a multiplicative function or a nonlinear function.

The T factor can be varied according to system requirements based on a value to be attributed to a timeliness factor. Thus, for example, an information unit that is first credited to an original contributor may be associated with a value of 1, while all other contributions of the same content after that point are scaled proportionately, or have some form of exponential decay. Thus, the T factors can be based on any convenient scale, such as ranging from 0 to 1, 1 to 10, 1 to 100, or any other desired range. Note that negative timeliness values may be useful in some embodiments.

Depending on system objectives, the T factors can be allocated as discrete values, so that all contributors, for example, providing a certain information unit within a block of time $T_b$ are all given the same T factor. This reflects the fact that in many cases a difference of a few minutes may not matter much to the consumer of the content. Routine experimentation can be done to assess the change or delta in time $\Delta T$ which would nonetheless permit two different time values to be associated with a common level or timeliness factor.

The net information contributed by the n-th entity, E, then can be described by an information set as illustrated in Equation 1 identifying every unique information unit contributed by E:.

$$E[n] = \{UI_1, UI_2, \ldots, UI_k, \ldots\} \quad \text{(Eqn. 1)}$$

If the timeliness of the information is also factored into the analysis, then a formula for the value of the information contributed by the nth entity E might be calculated by the system according to Equation 2 in vector form as follows:

$$VE[n] = (UIC_1 * T_1, UIC_2 * T_2, \ldots, UIC_k * T_k, \ldots, UIC_{max} * T_{max}) \quad \text{(Eqn. 2)}$$

Where $UIC_k$ refers to and reflects a value attributed to the particular entity E[n] for contributing (or not contributing) the kth information unit UI. In this instance $UIC_k$ is nominally equal to unity (1) when the entity has contributed $UI_k$ to the datastream, and is zero otherwise for that information unit slot. The allocation of the data units can be done easily in automated process by starting off with the corpus of documents/data, identifying the information units, and crediting them where appropriate to the network users.

Note that other types of factors, formulas, etc., can be used in alternate embodiments to yield an information value contributed by an entity, or the value of such information, particularly as concerns a particular topic. While in some embodiments, all information units (UI) are given the same nominal value (1), some information (within or without regard to a topic) may be valued higher. In fact, for certain content identified or considered as spam, it is possible that negative values can be assigned to the information units as a mechanism for weeding out irrelevant or undesirable data in the user's stream.

Other entities, such as advertisers, may pay for organic "boosts" of their content to secure a higher information value score for their links within a particular topic. This type of advertising can be used as a complement to or in lieu of other traditional forms of in-stream advertisement insertion.

In still other embodiments, a user's location information or identification value might be used to permit them to adjust/boost the scores of other users/contributors who are closer to them geographically. In addition a location identification value may be associated with an information unit as well, so that a computation can be done of a geographic relevance of an information unit to the user as well. This has the effect of effectively biasing the user's experience to a local flavor of interest.

Furthermore, in some embodiments, it may be desirable to calculate an additional content score based on original content in the message that goes beyond the information unit itself. For example, a message that contains a link to an event may contain additional information, commentary or opinion about the event, which data can be ascribed an additional originality score OC[n]. Metrics for assessing the relative novelty of information are well-known in the art, and any convenient mechanism can be used with the present invention. Some individuals can be rewarded, therefore, for providing additional (non-spam) commentary. This originality score can be added to the information value score (for example OC1+C1*T1) or can be used as an additional scalar (for example OC1*C1*T1) or in some other desirable manner to affect an overall information value score for the contributor. Other examples will be apparent to those skilled in the art upon reading this disclosure.

Figure 4:
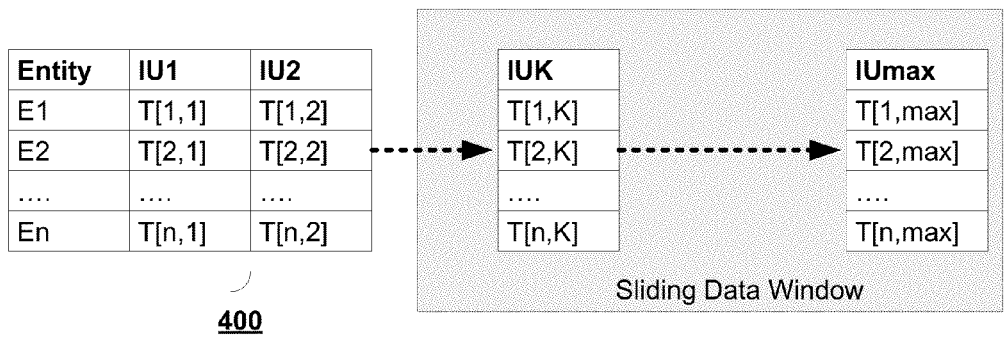
FIG. 4 depicts a typical table or database constructed as an entity/information unit table in accordance with an exemplary embodiment of the present invention.

As further depicted in FIG. 4, to accommodate the fact that contributors' value may decline over time (due to lack of recent contributions), a sliding data window (which can be programmed to have a certain predefined time window of a number of hours, days, weeks, etc.) may be employed during the calculation to determine the extent and value of information contributed. Alternatively, the individual information units may themselves be associated with a time constant that introduces some form of controlled gradual or exponential decay in the value of the information. For example, the value of C1*T1 at time Tf is equal to C1*T1*e(−kTf) where k is a selectable constant. Again, other well-known measures for introducing a decay value associated with staler content can be used as desired.

At step 125, the value of the contributions by each contributor, possibly on a topic or category basis, are sorted by a message distribution system into a list or table for later reference. This table can take any suitable form that allows for ease of manipulation and presentation to interested users of the message distribution system. Independent lists can be made on a topic basis and presented to the community of users so that new participants can in fact see the best and most valuable contributors (from an information perspective).

Figure 5:
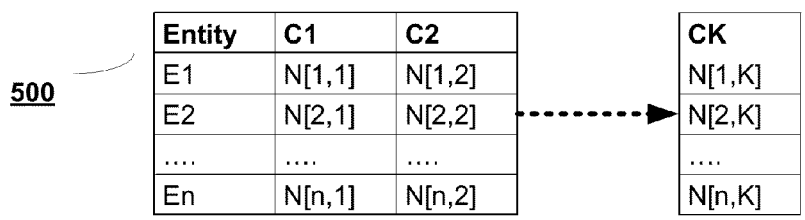
FIG. 5 depicts a typical table or database constructed as an entity/information value table in accordance with an exemplary embodiment of the present invention.

As shown in FIG. 5 therefore, a table can be generated identifying a unique content contribution value score N associated with each of a number of topics C for each entity E. This table in effect can be used to identify authoritative sources for information in particular topics. Since the system cannot be gamed by simply repeating the same content, or by the popularity of the entity in question, it helps to provide a level playing field for identifying true original and authoritative sources of useful information. Other forms of tabulation may be employed without deviating from the spirit of the present teachings.

An additional optional operation that can be performed at this time also is a "uniquing" process by which some embodiments can classify and differentiate between contributors to identify persons who are most alike in terms of their content contributions and the value of such contributions. In one simple approach, the system can simply identify which entities have contributed the same content, without regard to a time for such contribution. This "overlap" calculation can be done as shown in table 700 in FIG. 7, depicting an overlap score, S(m,n), between each pair of entities En, Em. This type of table can be constructed on a category or topic basis to allow for finer granularity in identifying duplicate/unique contributors. When an information value is considered instead, a similar table can be used, where each entry S(m,n) represents a mathematical calculation of the sum of the square root of the squared differences, a well-known formula for identifying a correlation between two data values. Other techniques can be used for identifying an amount of information value overlap.

Table 700 can be consulted—as described below—for each user's list to identify entities within the user's existing list of followees who are effectively redundant sources within the user's data stream. In other words, after determining that the net information gain from having both sources within the user's stream is small, and given the unnecessary duplication of content, it may be suggested or recommended to the user that they eliminate one of the two entities. Particularly in fields where the same content tends to be repeated by a large group of individuals, this technique has the advantage of eliminating large number of "parrot" contributors whose only contribution is in this form. In some cases, too, it is known that groups of individuals may act in concert to spam or pollute a data stream with self-serving advertising or other content. Use of embodiments of the present invention therefore can result in a cleaner, less cluttered stream that is richer in information and reduced in "noise" (duplicate or unwanted content).

An additional related operation can be performed at step 130 to identify a relative "coverage" score for each contributor on a topic. Qualitatively what this calculation represents is a rough measure of authority that a particular entity has in a field by comparing them not only to other entities, but also to the entire topic as a whole. Based on this calculation, and other data gleaned from the uniquing operations discussed above, the system can glean for a particular user the amount of coverage they create for a particular topic. This illustrated in a visual/numeric score as seen in FIG. 8A. The coverage score helps the system (and users) to identify which entities need to be added to a user's followee list to comprehensively cover a particular topic. While it can be expected that not all possible content for a particular topic can be covered by a small number of entities, it is possible to allow the user to fine tune either the coverage or number of followees to reach a desired goal.

By monitoring the adoption by users of content contributors the present system can also easily identify and quantify the value of the information being contributed. That is, the information unit values as noted above can have a non-binary utility value C which can be adjusted dynamically based on measuring what information is considered by the community to have value. For example each information unit may begin with a nominal value of 0.5, and this value is increased or decreased based on a consumption of the content in the IU, and/or an adoption rate for users who provided such content item into the system. The range for the values may be bounded by 0 and 1, again, or by some other convenient mechanism. In this way the value of information can be further quantified with reference to the consumers of the same who can influence the behavior of the system.

The coverage for the user's topic (or topics) can be depicted in numerical, graphical or some other useful visual form to help illustrate the extent and any gaps in the user's datastream concerning the topic in question. The coverage might be depicted in a two-dimensional pie chart or square chart that identifies visually how much unique information the user perceives, such as seen in FIG. 8A. An indication of the content contributed by individual entities {E1, E2, E3} followed by the user can also be shown for reference as see in the overlapping circles. Other variants/embodiments will of course be apparent to those skilled in the art upon reading this disclosure.

Returning to FIG. 1, at step 133, a user may be interested in adding new followees that they have seen or heard about. In this type of scenario, the user is interested in knowing what net value would be gained from including such new followees (F1, F2 . . . ) in his/her data stream. Accordingly, at step 134 the system calculates net information gain provided by the new followees, and presents the user with additional information on the net coverage gained in a topic of interest, along with any information on the followee's level of duplication with another entity already on the user's list. FIG. 8B depicts an exemplary embodiment of a visual presentation of this data. For a topic such as "NFL Football" for example, it indicates the new coverage based on adding F1, as well as other metrics such as the amount of duplication resulting from adding F1, the amount of off-topic information, etc. The information can be expressed visually, by reference to a certain number of messages over time, or by some other convenient metric. As further seen in FIG. 8B, a visual diagram may show the contribution of F1 over that offered by other entities on the user's existing lists, and the amount of off-topic information. After such being presented such data, the user can elect to accept or reject the proposed followee at step 140.

Figure 8C:
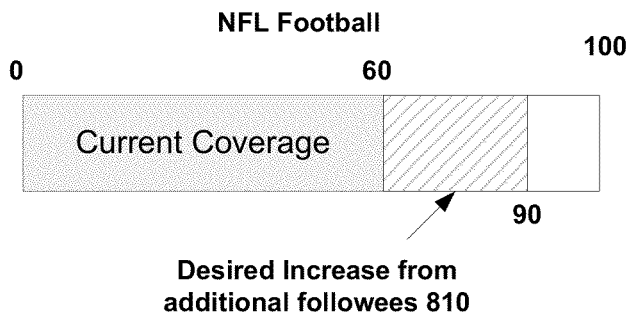
FIG. 8C depicts a format and substance of a typical topic—content information gain/coverage graph/visualizer which can be used in accordance with an exemplary embodiment of the present invention.

As an alternate process, as noted above, the user may be informed at step 130 that their content coverage within a particular topic (or across all topics as needed) is at a certain amount, such as a percent, within a visual coverage chart. Consequently, as seen in FIG. 8C, the user may indicate to the system that they want to increase their coverage by a certain amount, or to incorporate certain entities 810 that may be identified uniquely on the coverage chart as potential new sources of content (beyond the user's existing list) who are optimal in terms of enhancing the user's coverage within the topic area. This interaction with the coverage graph may be implemented using a conventional interactive slider tool within the user's browser.

Therefore, at step 135 (FIG. 1), the system again identifies these new contributors, and automatically suggests/recommends them to the user. For each new followee the system can provide an indication of the score, percentage, etc. that is contributed by the recommendation over the user's existing list. The system can account for and review each followee to determine their degree of uniqueness again vis-à-vis the user's other existing list members.

Figure 8D:
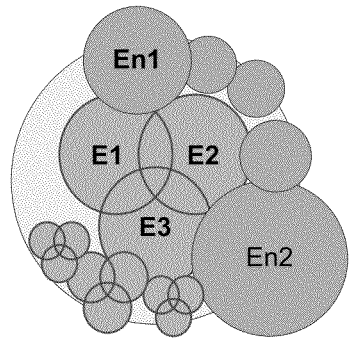
FIG. 8D depicts a format and substance of a typical entity recommender graph/visualizer which can be used in accordance with an exemplary embodiment of the present invention.

In other words, the system avoids suggesting duplicate content contributors when it gives suggestions on how to increase the coverage. Thus, as between a first new candidate/proposed followee with a 10% net new coverage and 50% duplication (over existing followees) and a second new candidate/proposed followee with a 10% net increased coverage and 25% duplication, the system preferably recommends the latter at step 137. As seen in FIG. 8D therefore, an output list of proposed new entities/followees to be added by the user can be presented.

This report by the system also contains other useful information again in the same manner as noted for FIG. 8B, including the resulting duplication, non-topic content, etc., in numeric and/or graphical form. Again, however, the user can accept or reject the candidate followees at step 140 to make the final decision. The user therefore has substantial control over the type of data filter that is superimposed over a datastream.

A further alternative is available in FIG. 1 through step 130 after the user has determined their coverage for a topic. With this feature, the user can simply request at step 136 that the system identify the smallest set of followees required to reach some minimum threshold of coverage. For example, the system could indicate that the set {F1, F2 . . . Fn} would be required to achieve N % coverage, and so on. The minimum sets can be constructed by the system in advance so that a minimum of duplication is presented to the user. The information for such type of feature could be presented within the same type of format as shown for FIGS. 8A-8D at step 138. It is expected of course that the number of followees required to achieve a certain benchmark value coverage will vary significantly according to topic.

In other embodiments, the system can account for other non-topic information contributed by the candidate followee that may be unuseful or irrelevant to the user, and which effectively acts as noise as far at that user is concerned. That is, the amount of on-topic information may be small compared to the prospective followees total content contributions, and thus including them may result in the datastream being filled with additional noise. To accommodate this option, the system can again compute a relevancy factor for the prospective followee as alluded to above. Thus, as between a first new candidate/proposed followee with a 10% net new coverage and 50% non-topic information (over existing followees) and a second new candidate/proposed followee with a 10% net increased coverage and 25% non-topic information, the system preferably recommends the latter. Again, however, the user can accept or reject the candidate followees at step 140 to make the final decision.

In any case, the system gives information to the user (either numerically or visually) of the net information gain presented by the new proposed followees within the topic. The amount of non-topic information can also be provided to help the user make an intelligent decision in the same manner as illustrated previously for the other alternatives shown in FIGS. 8A-8D.

Embodiments of the invention therefore allow users to more carefully craft lists of entities to follow within a data feed stream, maximizing the amount of useful information while removing redundancy, off-topic data, and other noise. The basic calculations done by such a source selection system to determine the information gained, noise contributions, off-topic contributions and similar calculations, etc., can be done off-line, periodically, and/or dynamically as may be possible with available computing resources. Due to the amount of content considered by the system, the recommendations for new followees might not be expected to vary significantly from day to day, and therefore the updates can be done at that frequency.

It will be apparent to those skilled in the art upon reading this disclosure that the system can also accommodate optimization of followee lists across multiple topic categories. In other words, if the user specifies (FIG. 1, step 105) that he/she follows categories/topics $C_1, C_2 \ldots C_k$ (FIG. 9) as compiled in table 900, the system can calculate the content contributions and content valuations across these multiple topics using the same methodology as noted above. One difference, of course, is that the computed vectors are now summed across the multiple categories for each contributor. Similarly, the uniquing and duplication calculations would be done across multiple topics for a comprehensive evaluation of the user's followee list.

Figure 8E:
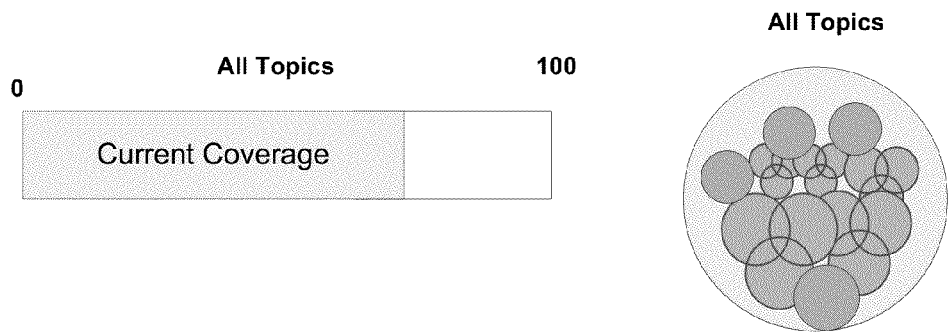
FIGS. 8E-8F depict embodiments similar to FIGS. 8A-8D in which visual feedback is presented across all topics followed by the user (FIG. 8E) and additional incremental information gain obtained by adding new users for all topics (FIG. 8F)
Figure 8F:
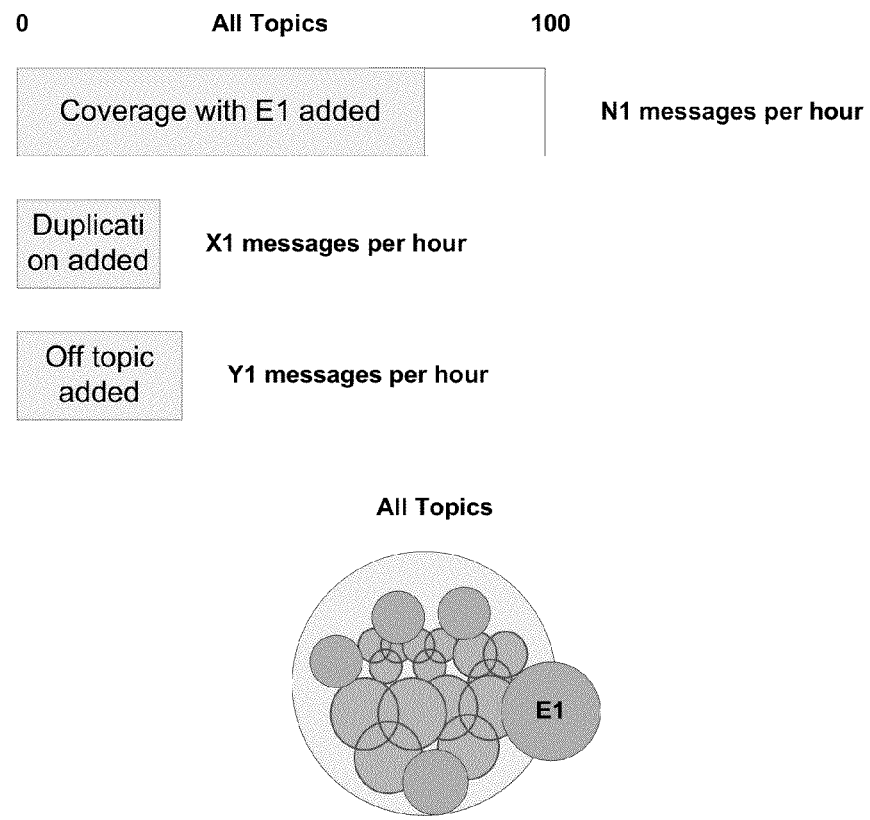

Accordingly the inventive processes of the present embodiments can be used to identify an existing coverage across all topics followed by the user (FIG. 8E) and indicate an additional incremental information gain obtained by adding a new user E1 as seen in FIG. 8F. Similar features such as illustrated in FIGS. 8C and 8D would be implemented in the same manner as described above for the single topic case.

One notable advantage of multi-topic information gain considerations is that the system can effectively consolidate and identify duplication between entities to reduce an overall user followee list, and thus the amount of information in the stream required to cover a set of topics. For example, a particular candidate content contributing entity Ec may contribute across multiple topics, such as to effectively duplicate the coverage provided by two other separate entities $\{E1, E2\}$ reporting on the same two topics separately. If Ec contributes less noise in other topics within the feedstream, the system can recommend such entity instead and again increase the overall signal/noise ratio of the datastream. It is expected that contributing entities will advertise and exploit their net information gain ratings as a promotional tool, and, for this reason, also be more likely to hone and retain such ranking to maintain their attention and loyalty with a set of followers.

Other additions to, modifications and variants of this approach to optimize the user's data feed will be apparent to those skilled in the art from the present teachings.

Figure 9:
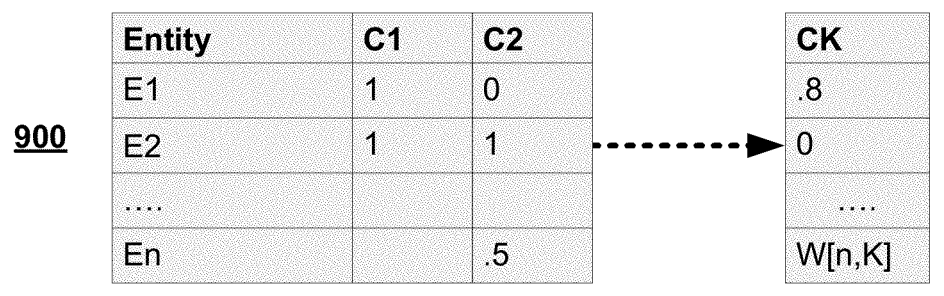

In other embodiments, the user may have the option of weighing the topics as well, as noted in FIG. 9. For example, the user may be given a range of values to indicate a desired weight (again, using any convenient scale, such as 0 to 1, 1 to 10, 1 to 100, etc.). Alternatively, these topic weightings might be automatically derived by the system from observing the user's behavior, including the posting and reviewing of content related to the topic. As illustrated in FIG. 9, the topic $C_k$ may be weighted only by 0.8 compared to 1 for $C_1$ for entity E1, and so on. In some instances, for ease of calculation, the weightings across all topics might be normalized to sum to some unit value.

In other embodiments, the new followees can be implemented using a temporary, probationary status within the user's datastream. This status may be altered directly by the user, or by default over some period of time unless altered by the user. This allows the user to go back to a prior state of his/her datastream as desired.

In yet other embodiments, processes can be implemented in hardware or software to treat certain content differently depending on various content header field values. For example, a content header may indicate explicitly that the content is a duplicate of some other piece of content already contributed by another member, who is also identified in the header. This is known in the Twitter™ system as "re-Tweeting" and in some cases, the system may not want to penalize a content contributor for this type of content duplication.

In other cases, some feeds automatically include messages from unrelated entities that are not on a followee list simply because an entity that is white listed on the user's followee list reproduces a message from that unrelated entity. This is frequently done by an entity that is seeking to populate the datastream with content from others that mentions the entity—i.e., a form of self promotion. As it currently is implemented, to prevent this, Twitter™ requires users to manually disable this type of feature individually from every entity contributor who happens to re-tweet content, which can be incredibly cumbersome to accomplish.

The source selection system can be used to identify such duplicates to automatically detect the duplicate content and suppress/prevent them from flooding a user's datastream. It will be apparent that other types of content can also be classified in different ways to enable the system to ignore or treat it differently than through the conventional calculations noted above.

Another benefit of the novel source selection system is that the value of advertising presented within a datastream is increased, since the datastream is no longer contaminated and overwhelmed with redundant information that results in important content being buried. The ratio of advertising messages to total messages is increased by removing less useful/noise messages, thus improving the chances of their being meaningfully absorbed and processed by a user.

As is also known, human beings have a natural saturation point beyond which they can handle relationships with new entities and thus process new data from the latter. This is sometimes referred to as "Dunbar's number" and is estimated to be between 100 and 250, with reference literature suggesting it is probably around 150. From even basic examinations of online sites, such as Twitter™ and Facebook™, it is apparent already that many users are far past this point, and cannot possibly absorb or understand the data presented by their followees. The source selection system therefore allows for users to "follow" larger number of entities in the sense that the overlap in content contributions can be ignored in most instances. Thus the user can, as a practical matter, remove followees without any penalty because their contributions are already embodied in another feed. In this model, the user is effectively following a much larger number of people than are reflected in their optimized followee list.

In addition, since the users are now receiving a higher percentage of relevant information germane to their topics they are less likely to miss important details, developments, events etc. This further increases the user experience relative to other systems which simply flood the user with every message related to a topic.

Still other embodiments could be used in social networking sites that offer a comparable newsfeed or newstream for their members, such as that offered by Facebook™. For example, a member's social network friends (or other sources in the social network) could be considered for their content contributions to a news feed. Using the processes described above, the message distribution system could determine the optimal mix of friends (or other sources) to be used as updates to comprehensively cover a category. In effect, the user's social network could be used in a similar manner as the followee list discussed above. Alternatively the invention could be used in social networking architectures that allow a user to unilaterally whitelist or create a connection even to unrelated sources (or members) for purposes of following that source.

In still other embodiments, a website that performs news aggregation (such as done by Yahoo!, Google, MSN, etc.) could employ these techniques to identify unique and valuable contributors of content to their site. Frequently, users of such sites customize their news stories based on particular news topics of interest. In this instance, the news aggregators' news sources could be used and evaluated in a similar manner as the followee list discussed above. The output of a recommender system in this instance would identify other potential useful sources of information to augment or replace existing content sources. Since most news aggregators rely on locality or popularity to link in/present stories, the system could be used to complement or replace these prior techniques.

In yet another embodiment the invention could be used to adjust email address lists for entities that permit employees to subscribe to specific topic/knowledge threads. In other words, an employee may have an interest in a particular project or topic within his/her company. By studying the content contained in emails of the organization, a system employing the present teachings could again create customized and optimized lists by topic to permit individuals to follow email threads concerning the topic. Assuming the information is otherwise designated by the email authors as shareable with the individuals seeking access, the system could effectively "whitelist" an individual by automatically designating them to be cc:d or bcc:d on the desired internal messages. This approach again has the advantage of allowing individuals to more rapidly identify useful sources of information within an enterprise.

Figure 6:
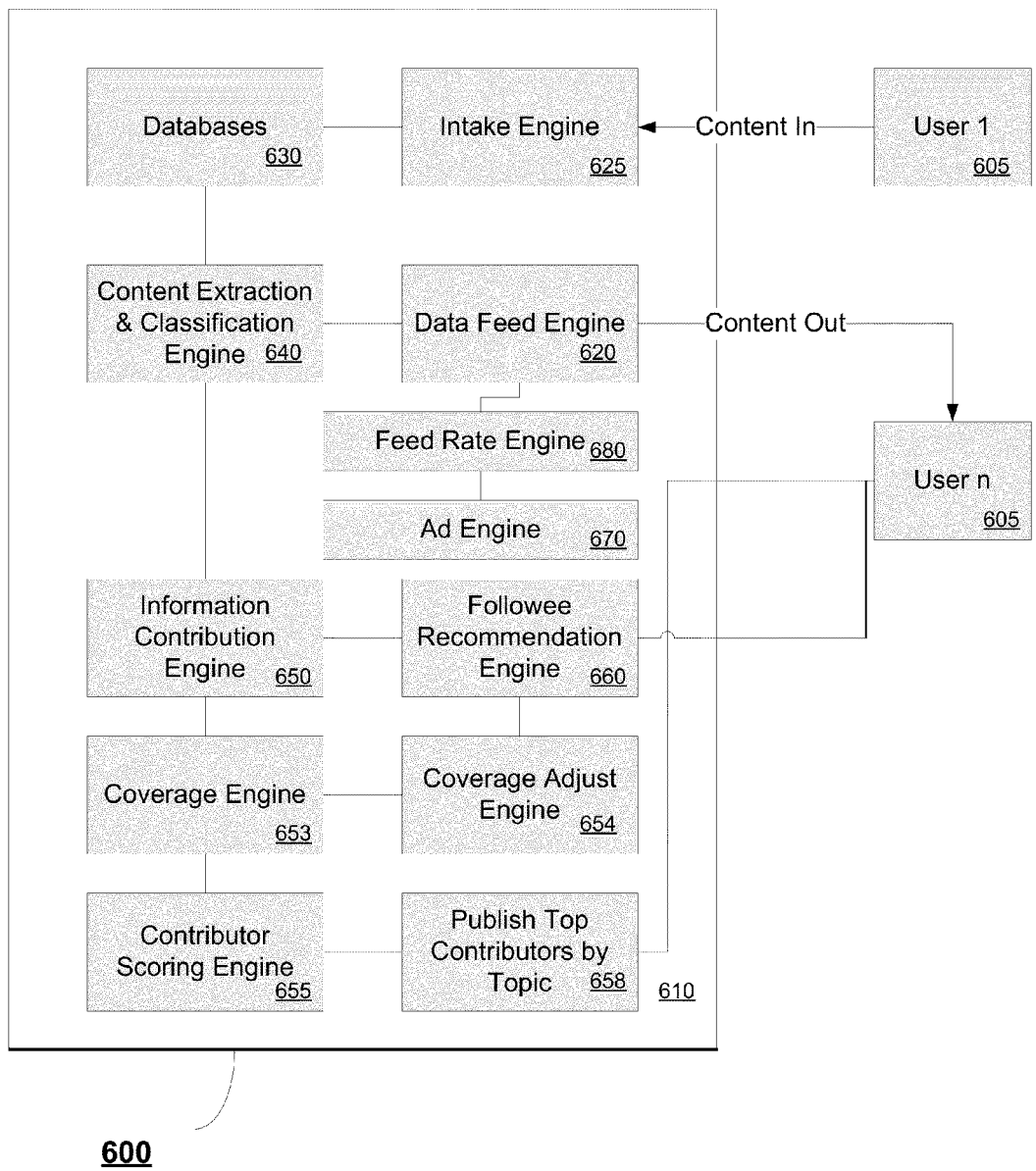
FIG. 6 depicts a preferred embodiment of a computing system employing and supporting the preferred processes described herein.

A preferred embodiment of a computing system 600 employing and supporting the aforementioned preferred processes depicted in FIGS. 1-5 and 7-9 is shown in FIG. 6. As seen herein, a server computing system 610 is preferably a collection of computing machines and accompanying software modules of any suitable form known in the art for performing the operations described above and others associated with typical website support. The software modules described below (referenced usually in the form of a functional engine) can be implemented using any one of many known programming languages suitable for creating applications that can run on client systems, and large scale computing systems, including servers connected to a network (such as the Internet). Such applications can be embodied in tangible, machine readable form for causing a computing system to execute appropriate operations in accordance with the present teachings. The details of the specific implementation of the present invention will vary depending on the programming language(s) used to embody the above principles, and are not essential to an understanding of the present invention.

As seen in FIG. 6, a number of users N 605 access the computing system over a network (such as the Internet) to obtain a customized datastream feed of the type described above. To simplify the description, only two users are shown but it should be understood that at any moment in time the number of users can be thousands or millions depending on available computing resources. As seen in FIG. 6, a first user 1 contributes content over the network to a content Intake Engine 625 which, as noted above, may process the data in accordance with the discussion for FIG. 1 noted above to effectuate the operations associated with steps 110/115 to analyze and format the messages shown in FIG. 2.

The resulting information from the Intake Engine 625 identifying and correlating topics, users, followers, followee lists, content, timestamps, weightings and tables described above are stored in any number of conventional databases 630 which may be relational databases to optimize speed, data compactness, etc. A Content Extraction/Classification Engine 640 further cooperates with Intake Engine 625 and Databases 630 to analyze the stored and incoming messages to identify topics, information units, contributors, etc., as discussed above for FIG. 1 (steps 110/115) and the information shown at 116/117. This engine also is responsible for the operations noted for step 120 (FIG. 1).

Returning to FIG. 6, an Information Contribution Engine 650 is responsible for performing the information contribution and value calculations noted above for reference number 120 (FIG. 1). An Information Contributor Engine 655 allocates credits to the individual entities in the manner described above again with reference to steps 120 to 125. A Coverage Engine 653 is responsible for performing generally the steps noted above as 130 etc. namely, determining the respective coverage by different contributors. This engine cooperates with an Adjustment Engine 654, which effectuates the various coverage adjustment features noted above in reference numerals 133, 134, 135, 136, 137, 138 for the users. The output of this engine is used by a Followee Recommendation Engine 660, which then provides the reports and suggestions (see FIGS. 8A-8F) within a suitable graphical interface to the user 605 to allow the latter to accept or reject the proposed additions/deletions of followees.

An Advertising Engine 670 is also employed to feed ads within a datastream in accordance with desired objectives of the datastream provider and an advertiser providing the ad stock. As noted above, since the signal/noise of content can be raised with embodiments of the present invention, it is expected that the perceptibility and utility of advertising should be higher as it is more likely to be seen.

A Feed Rate Engine 680 operates to carry out another unique operation that can be implemented in some embodiments, namely, a governor or throttling function. This feature allows a user to specify a number of messages or content that they wish to peruse within a datastream within a certain period of time for one or more topics. For example, a user may specify that they want to see only a certain number N of messages per minute, per hour, per day, etc. In some instances they can further specify the overall size of the datastream (number of messages) that can be seen at any moment in time. Since the system and process are extremely effective at identifying useful content, this feature can be used to fill a user's datastream at some desired consumption rate. In effect, in some embodiments, the user could designate both a primary and secondary set of followees, the latter of which are only accessed (based on some priority, or based on a random selection) and presented on an as-needed basis, such as when the user's datafeed is otherwise below a predetermined (user adjustable) threshold. In this manner some embodiments of the invention can implement a form of flexible followee lists that respond to a desired interest in a particular topic.

The consumption rate can be adjusted as a number of messages per time period, which can be hours, minutes, etc., depending on the user's goals and system capabilities. Other metrics could be used to allow the user to specify a desired fill-rate and a trigger mechanism to determine when to access the secondary content sources.

The user's selected content, as determined by his/her optimized/customized followee list, is then presented through a Data Feed Engine 620, which can be of the same type known in the art for presenting a conventional datastream to the user. A number of techniques for presenting the user's preferred data within a graphical interface (including a mobile interface in some instances) can be used for this purpose. Note that since it is commonly the case that some individual entities will themselves duplicate content (by repeating it over some period of time within a broadcast/feed), the Data Feed Engine can be further programmed to identify additional duplication that way and eliminate it from the feed.

By preventing entities from flooding the feed with duplicate content, the signal/noise ratio can be improved even further. Thus, the system can check any new information units presented in messages against prior messages presented in the user's data feed. If a duplicate is detected, it can be selectively blocked depending on the user's setting for such behavior. In some instances, the Data Feed Engine can highlight certain messages visually with some form of enhancement (bolding, flashing for example) to indicate that they are duplicates of prior content and therefore may be more important. Other mechanisms for indicating the prevalence of a particular information unit can be used, such as providing a numerical indicator alongside or superimposed over the message to indicate a number of the community and/or the user's followee list who have broadcast/published the item. It will be apparent that embodiments of the invention can be used to identify and minimize "spam" as well using the present teachings.

Other modules may be advantageously employed or that are necessary for operation of a website to support the above processes might be included as well, but need not be described in detail her, for clarity, but could be implemented as desired. In addition, it is to be understood that these are merely examples, and other applications that require human consumption of content are clearly potential beneficiaries of the aforementioned techniques. Using the systems and/or methods described herein, an additional beneficial effect is provided in that it will introduce users more quickly to sources of useful info faster is otherwise available, and increase the amount of serendipitous discoveries of new sources. Since conventional recommender systems eventually tend/trend over time to predominantly favor popular items, they can be less effective in terms of identifying new interesting sources of information. In some embodiments, the system can be adjusted (when all other information gain factors are otherwise equal) to present the new followees randomly to eliminate any follower "bias" effect that may creep in over time and which can distort the true value of the contributions of users.

One advantage is an intelligent tool to prune a social/information system so as to eliminate unnecessary connections that do not contribute anything useful to the user's experience or understanding. It is expected that news organizations can benefit from the present teachings as they could effectively create comprehensive coverage of topics through content aggregation from multiple sources that can be single sourced instead. In other words, a broadcasting entity could use the techniques to identify an optimized minimum member set of key contributors within a particular topic space required to achieve a certain percentage of coverage. Then, the entity could track and imitate the content of such set to effectively create a logical data feed (effectively a type of proxy group) that emulates an optimized information channel for the topic in question. Individual news broadcasters could then compete for end user attention/followers on a topic by topic basis based on their overall signal/noise ratio and coverage rate for the topic in question.

As seen in box 658 (FIG. 6), the top contributors by topic can be published to the end user community for general interest and for their use in selecting optimal followees as well. The top contributing entities can also be specially identified or designated within the datafeed by the system to recognize their status as authoritative for the topic in question based on a net information/information value consideration.

From an advertiser's perspective, advertising can be targeted to messages based on an entity's information/information value contribution within one or more topics, rather than simply being based on a number of lists that they appear on. As it is expected that useful contributing entities will be more heavily followed eventually, an advertiser can benefit from the ensuing adoption of such entities to carry their content alongside any information units.

It should be noted at that this time new trends in personalization emphasize the importance of a user's entire social graph content over that generated by automated algorithms. However, as explained above, this is not sufficient since even such content cannot be efficiently managed with current tools. Embodiments of the present invention offer a more desirable datastream for users, since they can combine the best aspects of both human (social graph) and automated curation which helps refine and select the social graph contributions.

It will be understood by those skilled in the art that the above are merely examples and that countless variations on the above can be implemented in accordance with the present teachings. A number of other conventional structures/steps that would be included in a commercial application have been omitted, as well, to better emphasize the present teachings.

It will be further apparent to those skilled in the art that the modules of the present invention, including those illustrated in the figures can be implemented using any one of many known programming languages suitable for creating applications that can run on large scale computing systems, including servers connected to a network (such as the Internet). The details of the specific implementation of the present invention will vary depending on the programming language(s) used to embody the above principles, and are not material to an understanding of the present invention. Furthermore, in some instances, a portion of the hardware and software will be contained locally to a member's computing system, which can include a portable machine or a computing machine at the users premises, such as a personal computer, a PDA, digital video recorder, receiver, etc.

Furthermore it will be apparent to those skilled in the art that this is not the entire set of software modules that can be used, or an exhaustive list of all operations executed by such modules. It is expected, in fact, that other features will be added by system operators in accordance with customer preferences and/or system performance requirements. Furthermore, while not explicitly shown or described herein, the details of the various software routines, executable code, etc., required to effectuate the functionality discussed above in such modules are not material to the present invention, and may be implemented in any number of ways known to those skilled in the art. Such code, routines, etc. may be stored in any number of forms of tangible machine readable media which are not merely carrier waves or a signal modulated by a carrier over a transmission medium. The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of recommending entities to a user for inclusion as content contributors for a datastream using a networked computing system comprising:
   a. automatically identifying with the networked computing system an information contribution provided by each of a base set of content contributing entities selected manually by the user in a white list;
   b. in response to a user request for suggestions for a first additional content contributing entity for inclusion on said white list, automatically comparing with the networked computing system content contributed by said base set of content contributing entities with content contributed by a plurality of candidate additional content contributing entities;
   c. automatically recommending to said user with the networked computing system a recommendation that one or more selected ones of said plurality of candidate additional content contributing entities be included or excluded from said white list based on a measured overlap in information content between said first additional contributing entity and said one or more of said plurality of additional candidate content contributing entities;
   d. in response to the user selecting one or more additional content contributing entities intended as information sources for the datastream, generating a visual display output for the user indicating graphically:
      i. a first predicted change in coverage in the user's datastream for first content associated with a first topic based on adding or removing one or more first content contributing entities; and
      ii. a second predicted change in coverage in the user's datastream for second content that is not associated with said first topic based on adding or removing said one or more first content contributing entities;
      wherein the user is presented with a visual diagram of changes predicted in the user's datastream as a result of content contributions of a user selected content contributing entity.

2. The method of claim 1, further including a step: controlling the user's datastream to automatically include content from said one or more selected ones of said plurality of candidate additional content contributing entities in response to the user choosing said recommendation.

3. The method of claim 1 wherein said measured overlap in information considers both a value of a common information unit contributed by both said base set of content contributing entities and plurality of candidate additional content contributing entities, as well as a timeliness factor in submitting such common information unit.

4. The method of claim 1, further including a step: obtaining a target coverage value specified by the user for said first topic, and using said target coverage value to determine an optimal set of said selected ones of said plurality of candidate additional content contributing entities required to achieve said coverage value for said first topic within the datastream.

5. The method of claim 4, wherein information duplication is minimized for said first topic by suppressing messages that include the same content as prior messages shown within the datastream.

6. The method of claim 1, wherein the measured overlap in information content is based on measuring uniform resource locator links within electronic messages.

7. The method of claim 1, wherein said measured overlap in information content is determined over a predetermined time window.

8. The method of claim 7, wherein said predetermined time window can be selected by the user.

9. The method of claim 7, wherein information contributions outside of said time window are reduced by an exponential function.

10. The method of claim 1, further including a step: generating a visual display output for the user, indicating graphically a predicted datastream message feed rate or predicted change in datastream message feed rate achieved based on adding or removing content contributing entities.

11. The method of claim 1, further including a step: generating a visual display output for the user, indicating graphically a value of a data duplication rate present within the user's datastream as calculated by the networked computing system.

12. A method of recommending entities to a user for inclusion as content contributors related to target topics in a datastream comprising:
   a. receiving an indication of a first target topic and a second target topic from the user;
   b. automatically identifying with the networked computing system an information contribution provided by each of a set of content contributing entities for both said first target topic and said second target topic;
   c. automatically recommending to said user with the networked computing system a subset of said set of content contributing entities based on said measured information contribution for both said first target topic and said second target topic;
   d. in response to the user selecting one or more additional content contributing entities intended as information sources for the datastream, generating a visual display output for said user indicating graphically:
      i. a first predicted change in coverage in the datastream for first content associated with at least one of said first target topic and second target topic based on adding or removing individual content contributing entities; and
      ii. a second predicted change in coverage in the datastream for second content that is not associated with at least one of said first target topic and second target topic based on adding or removing individual content contributing entities;
      wherein said user is presented with a visual diagram of changes predicted in the datastream as a result of content contributions of a content contributing entity.

13. A method of recommending entities to a user for inclusion as content contributors related to a topic in a datastream comprising:
 a. receiving an indication of a target content topic and a target topic content coverage value from the user;
 b. automatically identifying with the networked computing system an information contribution value provided by each of a set of content contributing entities for said target content topic;
 c. automatically generating with the networked computing system an initial subset of said set of content contributing entities which achieve said target content coverage value based on said measured information contribution;
 d. configuring and adapting the user's datastream with the computing system to include content from said initial subset of content contributing entities;
 e. in response to the user selecting one or more additional content contributing entities intended as information sources for the datastream, generating a visual display output for said user indicating graphically:
  i. a first predicted change in coverage in the datastream for first content associated with said target topic based on adding or removing individual content contributing entities; and
  ii. a second predicted change in coverage in the datastream for second content that is not associated with said first topic based on adding or removing individual content contributing entities;
 wherein said user is presented with a visual diagram identifying changes predicted to result for the user's datastream caused by content contributions of a content contributing entity.

14. The method of claim 13, wherein the networked computing system further calculates and automatically controls the datastream to include data from a first content source having a first information contribution value and not from a second content source having a second information contribution value when an amount of content overlap calculated between the first information contribution and the second information contribution exceeds a first threshold.

15. The method of claim 14, wherein the first information contribution and the second information contribution are measured by identifying uniform resource locator links within electronic messages.

16. The method of claim 14 further including a step:
 automatically selecting with the networked computing system an optimized subset of one or more of such entities from the plurality of content contribution entities for inclusion as sources to be published within the user datastream, which optimized subset is determined by computing a signal to noise ratio of said first content and said second content.

17. The method of claim 1 wherein said one or more additional content contributing entities are generated by a recommendation engine and presented as a list to the user by the networked computing system.

18. The method of claim 1 wherein said visual diagram includes graphics and numerical text.

19. The method of claim 1 wherein said visual diagram includes charts and numerical text.

20. The method of claim 1 wherein said visual diagram includes an image of a set of partially overlapping individual regions, and such that each individual region corresponds to a different content contributing entity.

21. The method of claim 1 wherein only information content from said first additional contributing entity that is unique and not derived from another entity is included as part of measuring such entity's information contribution.

22. The method of claim 12 wherein only information content from said first additional contributing entity that is unique and not derived from another entity is included as part of measuring such entity's information contribution.

23. The method of claim 12 wherein separate weightings are assigned to said first target topic and second target topic based on user input.

24. The method of claim 12 wherein separate weightings are assigned to said first target topic and second target topic based on observing user behavior.

25. The method of claim 12 wherein the networked computing system consolidates and reduces a number of entities selected by the user during step (c).

26. The method of claim 12 wherein the networked computer system computes and publishes net information gain statistics for topics to said user.

27. The method of claim 13 wherein said visual diagram includes graphics and numerical text.

28. The method of claim 13 wherein said visual diagram includes charts and numerical text.

29. The method of claim 13 wherein said visual diagram includes an image of a set of partially overlapping individual regions, and such that each individual region corresponds to a different content contributing entity.

30. The method of claim 13 wherein only information content from said first additional contributing entity that is unique and not derived from another entity is included as part of measuring such entity's information contribution.

31. The method of claim 13 wherein step (e) occurs in response to a user request to modify said subset of content contributing entities.

32. The method of claim 13 further including a step: automatically repeating step (d) in response to changes in said set of content contributing entities.

33. The method of claim 32 wherein step (e) occurs in response to the computing system automatically identifying new individual content contributing entities.

* * * * *